US008665721B2

(12) United States Patent
Ang et al.

(10) Patent No.: US 8,665,721 B2
(45) Date of Patent: Mar. 4, 2014

(54) SYSTEMS, METHODS, AND COMPUTER READABLE MEDIA FOR MAINTAINING PACKET DATA PROTOCOL (PDP) CONTEXT WHILE PERFORMING DATA OFFLOAD

(75) Inventors: Gibson Soon Teck Ang, Westford, MA (US); Thomas Gschwendtner, Salem, MA (US); Jie Wang, Westford, MA (US)

(73) Assignee: Genband US LLC, Frisco, TX (US)

( * ) Notice: Subject to any disclaimer, the term of this patent is extended or adjusted under 35 U.S.C. 154(b) by 222 days.

(21) Appl. No.: 13/032,613

(22) Filed: Feb. 22, 2011

(65) Prior Publication Data

US 2012/0213073 A1    Aug. 23, 2012

(51) Int. Cl.
*H04L 12/26* (2006.01)
*H04H 20/71* (2008.01)
*H04W 4/00* (2009.01)

(52) U.S. Cl.
USPC ............................ 370/235; 370/312; 370/338

(58) Field of Classification Search
USPC ................. 370/235, 328, 331, 332, 312, 338; 445/418; 455/418
See application file for complete search history.

(56) References Cited

U.S. PATENT DOCUMENTS

| 2007/0127364 | A1* | 6/2007 | Chaudry et al. | 370/216 |
| 2008/0130594 | A1* | 6/2008 | Suzuki | 370/338 |
| 2010/0061340 | A1* | 3/2010 | Ramle et al. | 370/331 |
| 2010/0128697 | A1* | 5/2010 | Choi-Grogan | 370/332 |
| 2011/0075605 | A1* | 3/2011 | De Pasquale et al. | 370/328 |
| 2011/0170469 | A1* | 7/2011 | Watfa et al. | 370/312 |
| 2012/0184258 | A1* | 7/2012 | Kovvali et al. | 455/418 |

OTHER PUBLICATIONS

3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 10), 3GPP TS 29.274, V10.0.0, pp. 1-172 (Sep. 2010).

"3rd Generation Partnership Project; Technical Specification Group Services and System Aspects; General Packet Radio Service (GPRS); Service description; Stage 2 (Release 10)," 3GPP TS 23.060, V10.1.0, pp. 1-310 (Sep. 2010).

"3rd Generation Partnership Project; Technical Specification Group Services and System Aspects; Service requirements for Home Node B (HNB) and Home eNode B (HeNB) (Release 10)," 3GPP TS 22.220, V10.4.0, pp. 1-25 (Sep. 2010).

(Continued)

*Primary Examiner* — Habte Mered
*Assistant Examiner* — Yaotang Wang
(74) *Attorney, Agent, or Firm* — Fogarty, L.L.C.

(57) ABSTRACT

Systems, methods, and computer readable media for maintaining packet data protocol (PDP) context while performing data offload are disclosed. According to one aspect, a method for maintaining PDP context while performing data offload includes detecting a data offload condition wherein a UE for which a first network node is maintaining a PDP context is sending or receiving data using a data path that does not include the first network node. While the data offload condition exists, packets are sent from a source other than the UE to the first network node so as to cause the first network node to maintain the PDP context for the UE. In one embodiment, a node interposed between the UE and the first network node periodically sends dummy packets or heart beat packets to the first network node on behalf of the UE, which may include packets that appear to come from the UE.

21 Claims, 7 Drawing Sheets

(56) References Cited

OTHER PUBLICATIONS

"3rd Generation Partnership Project; Technical Specification Group Radio Access Network; UTRAN architecture for 3G Home Node B (HNB); Stage 2 (Release 9)," 3GPP TS 25.467, V9.3.0, pp. 1-34 (Jun. 2010).

"Home Node B," http://en.wikipedia.org/wiki/Home_Node_B, pp. 1-2 (Downloaded from the Internet on Nov. 20, 2009).

"3rd Generation Partnership Project; Technical Specification Group Services and System Aspects; System enhancements for the use of IMS services in local breakout and optimal routeing of media (Release 9)," 3GPP TR 23.894, V1.1.1, pp. 1-44 (Apr. 2009).

* cited by examiner

SYSTEMS, METHODS, AND COMPUTER READABLE MEDIA FOR MAINTAINING PACKET DATA PROTOCOL (PDP) CONTEXT WHILE PERFORMING DATA OFFLOAD

TECHNICAL FIELD

The subject matter described herein relates to communications involving a mobile subscriber operating in telecommunications network. More particularly, the subject matter described herein relates to systems, methods, and computer readable media for maintaining packet data protocol (PDP) context for a user equipment (UE) while a data offload involving the UE is being performed.

BACKGROUND

General packet radio service (GPRS) is a packet-oriented mobile data service for cellular communications systems. FIG. 1A illustrates a conventional telecommunications network that includes a GPRS component. A user equipment UE1 100 communicates over an air interface to a node B 102, which is controlled by and communicates over a wired interface with a radio network controller RNC 104. A serving GPRS support node (SGSN) 106 is responsible for the delivery of data packets from and to the mobile stations within its geographical service area. A gateway GPRS support node (GGSN) 108 is responsible for interworking between the GPRS network and external packet switched networks, such as Internet protocol (IP) network IPNW1 110. Signaling and data traffic that is moving in the direction from the UE to the GGSN is referred to as moving "upstream" and traffic in the opposite direction is referred to as moving "downstream".

GGSN 108 is the anchor point that enables the mobility of UE1 100 in the GPRS network. GGSN 108 converts the GPRS packets coming from SGSN 106 into the appropriate packet data protocol format (e.g., IP or X.25) and sends them out on the corresponding packet data network, e.g., IPNW1 110. In the other direction, PDP addresses of incoming data packets are converted to the appropriate packet data protocol of the GPRS network and are addressed to the address of the destination user as he or she is known to the cellular network. The readdressed packets are sent to the responsible SGSN, e.g., to SGSN 106. For this purpose, GGSN 108 stores the current SGSN address of the user and his or her profile in its location register. Thus, GGSN 108 maintains a mapping of the user's address within the GPRS network and the user's address within the external packet network. For example, GGSN 108 may map a global system for mobile communications (GSM) address to an Internet protocol (IP) address, and vice versa.

A PDP context is a data structure that contains information about an active session 112 with a subscriber. Conventionally, the PDP context includes the subscriber's IP address, the subscriber's international mobile subscriber identity (IMSI), and information that the GSNs use to identify data relate to a particular PDP context, such as a tunnel endpoint ID (TEID). In the example conventional network illustrated in FIG. 1A, GGSN 108 maintains a context database 114 that maps IP addresses to user equipment currently using the network. In this example, context database 114 indicates that the IP address 192.168.0.34 has been assigned to UE1 100 and that other IP addresses have been assigned to other user equipment, e.g., UE2 and UE3, not shown. Context database 114 may be a database, a table, a collection of data structures stored in volatile or non-volatile memory, or other suitable means for maintaining information for use by GGSN 108. Context database 114 may be stored within or collocated with GGSN 108, or it may be remotely located from GGSN 108.

Once a session is terminated, the PDP context for that session is cleared or discarded, and network hardware resources that were formerly allocated to the session may be released so that these resources may be used for another session. The PDP context is usually maintained by a GGSN but a copy of the PDP context may also be present on and used by a SGSN.

FIG. 1B is another conventional telecommunications network that uses a home node B (HNB) 118 in place of node B 102 and RNC 104. The components UE1 100, SGSN 106, GGSN 108, IPNW1 110, session 112, and context database 114 are identical to their like-numbered counterparts in FIG. 1A and therefore their descriptions will not be repeated here. Unlike the node B, a home node B is a low-power device designed to provide a limited area of coverage, such as within a house, office, or building. A home node B can provide cellphone coverage in an area that is too far from commercial cellphone towers and their associated node Bs. Unlike a node B, which is typically physically accessible only by personnel authorized by the network operator, physical access to a home node B may not be similarly restricted and is thus considered inherently insecure. For this reason, HNB 118 must go through a security gateway SeGW 120 to get to the network operator's network. Upstream from security gateway 120 is a home node B gateway, or HNB-GW 122, which is part of the signaling path between the UE and the GGSN and which may also be part of the data path between the UE and the GGSN. In the conventional network illustrated in FIG. 1B, SeGW 120 and HNB-GW 122 are on both the signaling path and the data path.

A session can be established with the GGSN that provides the connection between a mobile device and the core network, even if no activity is occurring for that session. For example, session 114 may be established between UE1 100 and GGSN 108 even in the absence of any data being communicated from UE1 100, through GGSN 108, to IPNW1 110. Once a PDP context is established on GGSN 108, resources are being used by GGSN 108 whether there is activity over session 114 or not. For this reason, GSN vendors may control the amount of time that a mobile session can remain inactive on a GGSN before a PDP context is cleared or discarded, thereby optimizing the memory resources of the GGSN. For example, a timer may be used to specify the amount of time that a mobile session can be idle before the GGSN purges the session, deletes the PDP context, and releases any resources that were associated with the session.

FIG. 1C illustrates the network of FIG. 1B showing a data offload condition involving UE1 100. A data offload is a situation in which a user equipment is sending or receiving data via a data path that does not include the GGSN which is currently maintaining that UE's PDP context. In FIG. 1C, UE1 100 may be a cellphone whose user has requested the download of a ringtone, or a mobile computing device which the user is using to download a file or view a media stream, etc. To reduce the data traffic load on GGSN 108, an alternate data path 124 may be established from UE1 100 to the source or destination of the data stream, which in FIG. 1C is another network IPNW2 116, although it could be just an alternate path into IPNW1 110 that bypasses GGSN 108.

FIG. 1C illustrates one problem with a GGSN that uses an idle timer in a network that supports data offload: when traffic to or from the mobile user is "offloaded" through another node and does not traverse the GGSN, the GGSN may erroneously believe that the user equipment has disconnected or does not need to maintain the session. In FIG. 1C, session 112 becomes inactive during the duration of the data offload via alternate data path 124. If GGSN 108 fails to detect any activity from UE1 100 for a period longer than the interval defined by its idle timer, GGSN 108 may free the context that it previously maintained for UE1 100. Context database 114 releases the IP address formerly assigned to UE1 100, 192.168.0.34, and may eventually assign it to a new user equipment, such as UE4 (not shown.) The end result is that the same IP address may be assigned to two active mobile devices simultaneously, as shown in FIG. 1D.

FIG. 1D illustrates the condition of the network after UE1 100 has completed its data offload and again transmits data packets to IPNW1 100 via GGSN 108. Session 112 is reactivated, but GGSN 108 has already assigned the IP address 192.168.0.34 to UE4. In this case, data coming from IPNW1 110 that should be routed to UE1 100 is instead routed to UE4, which did not request that data, and vice versa. This has potentially disastrous implications, not the least of which is the possibility of security breach or privacy violation.

A conventional solution to this problem is to not provide an idle timer capability, i.e., the PDP context is always maintained until torn down manually by the SGSN. However, this solution is not ideal because it requires the SGSN to vigilantly monitor PDP sessions and take affirmative action to tear down the PDP context, which also generates additional traffic between the SGSN and the GGSN. In order to reduce the overhead on the SGSN, the SGSN may be less vigilant, e.g., to check the sessions less frequently, but this approach has the potential to tie up resources within the GGSN for longer than is necessary. An additional problem with conventional systems is that in some circumstances the data path from the RNC to the GGSN bypasses the SGSN. In this scenario the SGSN has no awareness of user plane activity or inactivity. Moreover, if the data offload occurs downstream from the SGSN, neither the SGSN nor the GGSN is able to monitor user plane traffic to determine whether to keep or discard the PDP context.

Accordingly, in light of these disadvantages associated with systems that support packet data offloading and that include SGSNs and/or GGSNs that use idle timers to determine when to purge PDP contexts, there exists a need for systems, methods, and computer readable media for maintaining PDP context on the GGSN while performing data offload.

SUMMARY

According to one aspect, the subject matter described herein includes a method for maintaining PDP context while performing data offload. In one embodiment, the method includes detecting a data offload condition wherein a UE for which a first network node is maintaining a PDP context is sending or receiving data using a data path that does not include the first network node. While the data offload condition exists, packets are sent from a source other than the UE to the first network node so as to cause the first network node to maintain the PDP context for the UE. In one embodiment, a node interposed between the UE and the first network node periodically sends dummy packets or heart beat packets to the first network node on behalf of the UE, which may include packets that appear to come from the UE.

According to another aspect, the subject matter described herein includes a system for maintaining packet data protocol context while performing data offload. In one embodiment, the system includes a data offload detection module for detecting a data offload condition wherein a UE for which a first network node is maintaining a PDP context is sending or receiving data using a data path that does not include the first network node and a PDP context maintenance module for sending, while the data offload condition exists, packets to the first network node so as to cause the first network node to maintain the PDP context for the UE.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for maintaining packet data protocol (PDP) context while performing data offload are presented. A data offload condition wherein the UE for whom a first network node is maintaining a PDP context is sending or receiving data using a data path that does not include the first network node is detected, and while the data offload condition exists, data packets are sent to the first network node from a source other than the UE so as to cause the first network node to maintain the PDP context for the UE. Reference will now be made in detail to exemplary embodiments of the present invention, examples of which are illustrated in the accompanying drawings. Wherever possible, the same reference numbers will be used throughout the drawings to refer to the same or like parts.

Figure 1A:
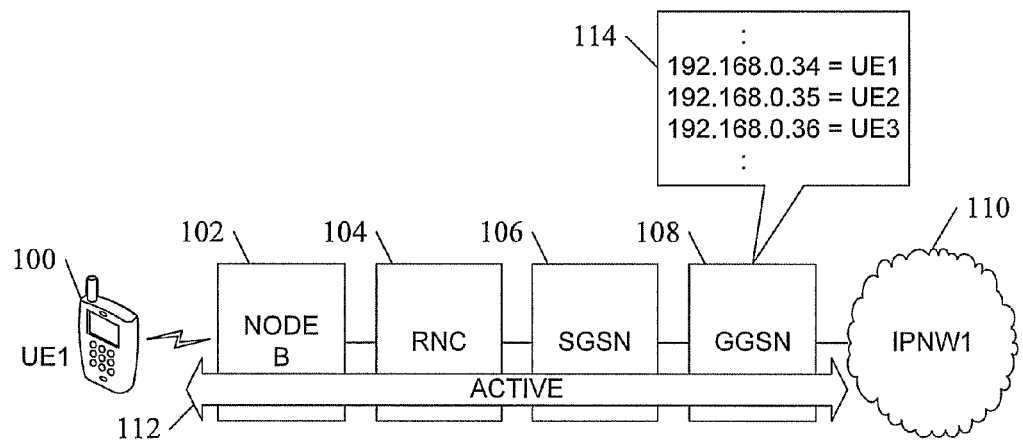
FIGS. 1A and 1B are block diagrams illustrating conventional telecommunication systems in which a mobile user establishes a session with a packet network.
Figure 1B:
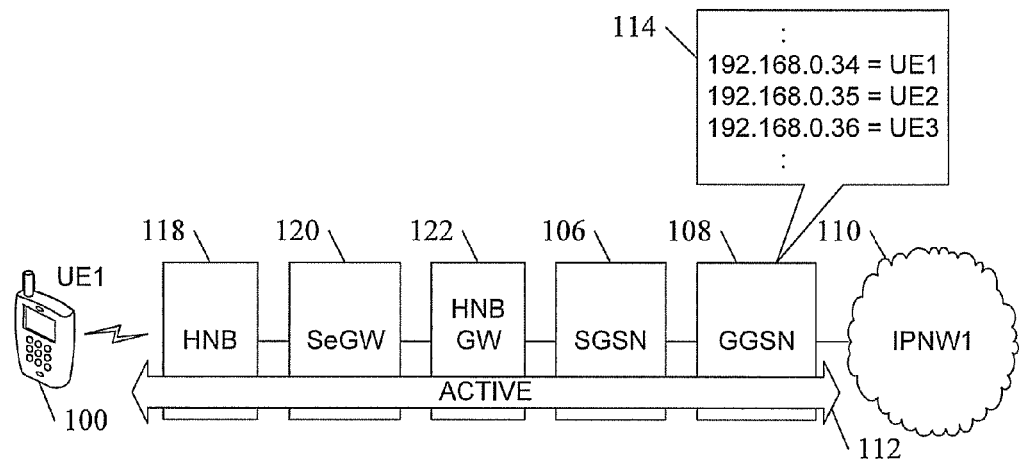
Figure 1C:
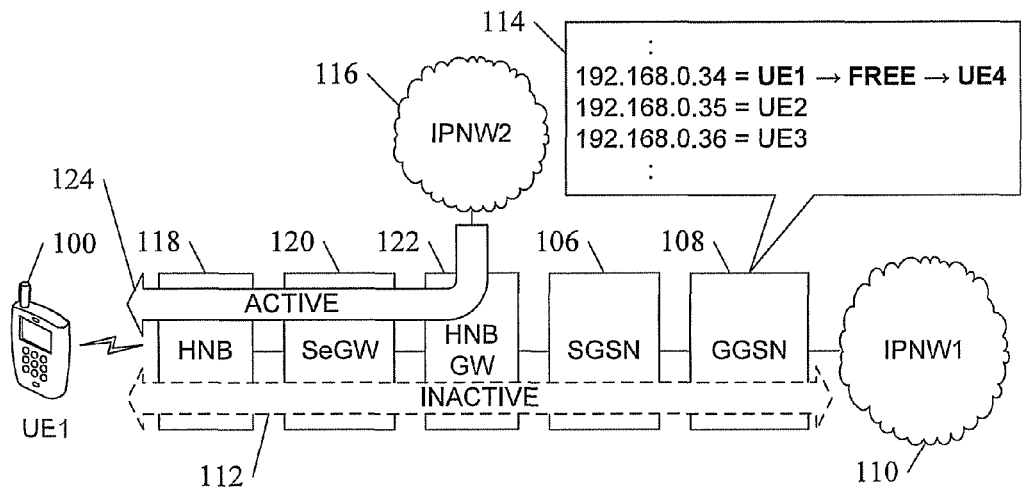
FIGS. 1C and 1D illustrate a problem associated with conventional networks which support data offloading and where the node responsible for maintaining the PDP context for a UE fails to maintain the PDP context for the UE during a data offload.
Figure 1D:
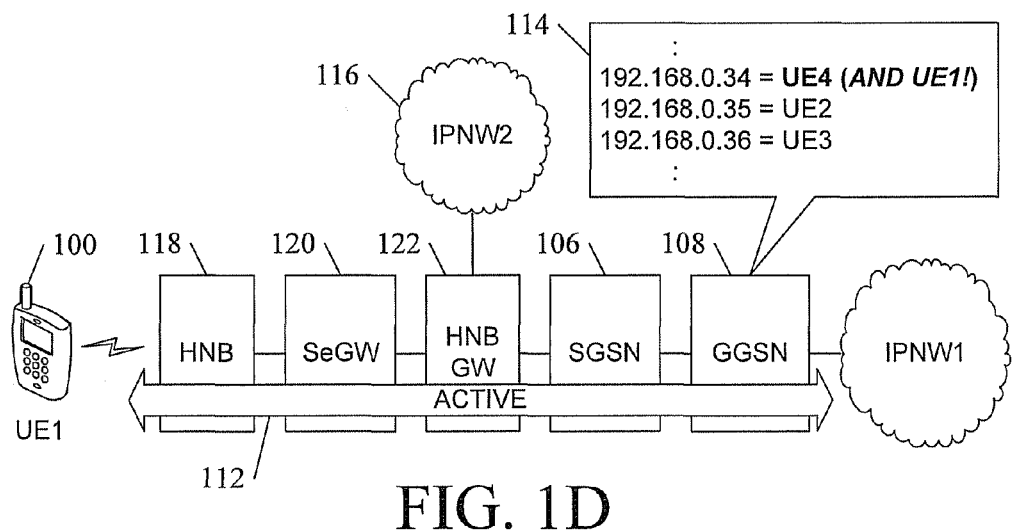
Figure 2A:
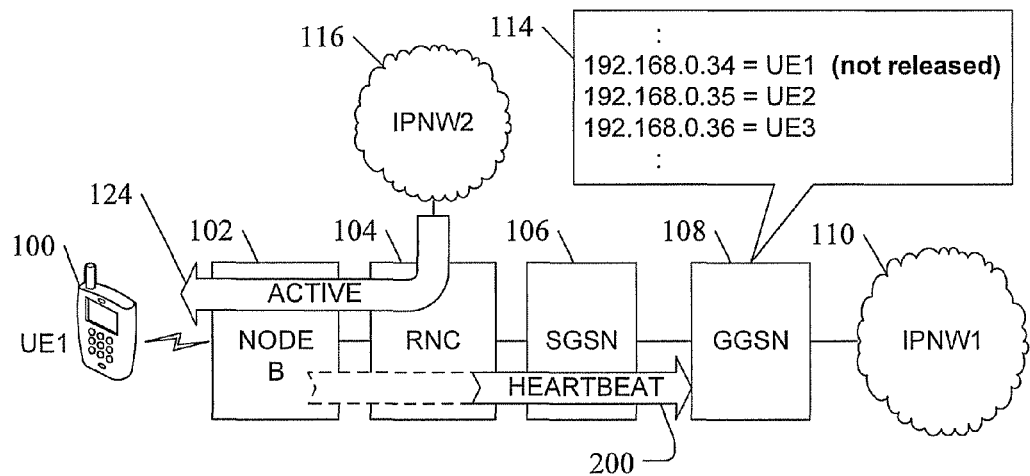
FIGS. 2A and 2B are block diagrams illustrating exemplary systems for maintaining PDP context while performing data offload according to an embodiment of the subject matter described herein.
Figure 2B:
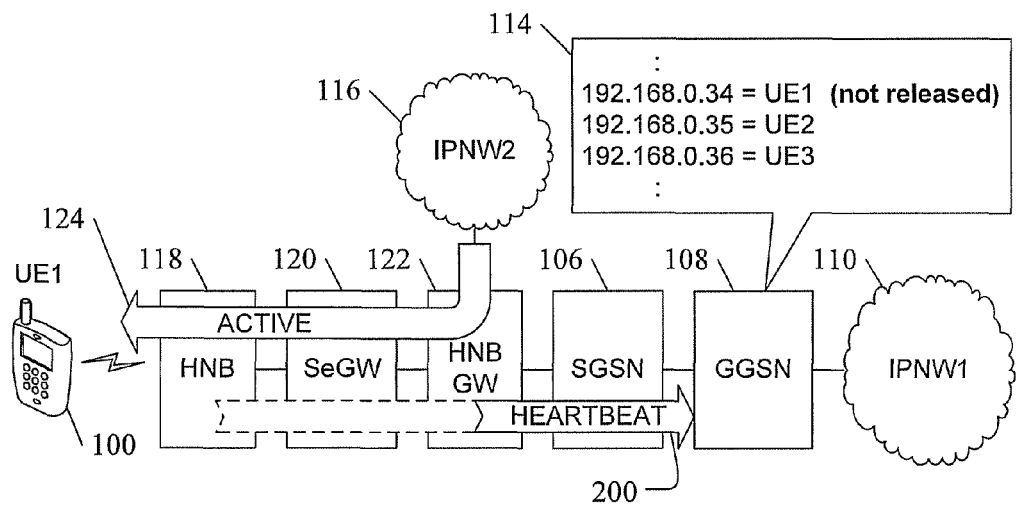

FIGS. 2A and 2B illustrate exemplary systems for maintaining PDP context while performing data offload according to an embodiment of the subject matter described herein. Elements UE1 100, node B 102, RNC 104, SGSN 106, GGSN 108, IPNW1 110, context database 114, HNB 118, SeGW 120, HNB-GW 122, and alternative data path 124 are identical to their like-numbered counterparts in FIGS. 1A through 1D and therefore their descriptions will not be repeated here, with the exception that the functions of RNC 104, node B 102, HNB 118, SeGW 120, and/or HNB-GW 122 may be modified or enhanced as described below such that data packets 200 are sent to GGSN 108 during a data offload condition so as to cause GGSN 108 to maintain the PDP context for UE1 100.

In one embodiment, a network may include one or more of an evolved node B, or (e)NB, and/or one or more of a home (e)NB, or H(e)NB. In these embodiments, the functions of the evolved node B and the home evolved node B may be substantially identical to the functions of node B 102 in FIG. 2A and HNB 118 in FIG. 2B, respectively. Furthermore, HNB-GW 122 may act as an aggregated RNC for multiple HNB or H(e)NB nodes.

In one embodiment, the sent data packets 200 may be a heartbeat signal or other periodic packet communication. In one embodiment, GGSN 108 may use an idle timer such that a failure to receive packets from UE1 100 within a timeout interval will result in the release of the PDP context for UE1 100. In this embodiment, data packets 200 may be sent periodically at a frequency sufficient to prevent the idle timer from timing out. Data packets 200 may also be sent in a non-periodic fashion yet sufficient to maintain the PDP context for UE1 100. In one embodiment, data packets 200 may not be sent if there is no data offload or when there are no packets received in response to the data offload. This allows the idle timer to operate in its intended manner, i.e., to cancel PDP contexts for sessions that are, in fact, idle.

In one embodiment, GGSN 108 may be configured to accept a command to "lock" a PDP context for an indefinite time or until further notice, or for a specified duration, such as an interval that is longer than the idle timer interval. In this embodiment, data packets 200 may include such a command issued upon detection of the data offload condition and may also include a command to "unlock" the PDP context upon detection of the end of the data offload condition. In one embodiment, GGSN 108 may be directed to ignore the idle timer in regards to a particular PDP context, e.g., by masking the timer overflow interrupt, etc. In this embodiment, PDP context database 114 may include a field within each context data structure that indicates whether an idle timer timeout should be ignored or not for that PDP context.

Referring now to FIG. 2A, in one embodiment, the data offload condition may be detected by node B 102, RNC 104, or by some other node positioned along the data path between UE1 100 and GGSN 108. The node that detects the data offload condition may be the same node as, or a different node from, the node that sends the data packets to GGSN 108 for the purpose of maintaining the PDP context for UE1 100. For example, in one embodiment RNC 104 may detect or even help negotiate the data offload and the establishment of alternative data path 122 between UE1 100 and IPNW2 116. In this embodiment, RNC 104 may be the source of heartbeat packets 200, or RNC 104 may instruct node B 102 to generate heartbeat packets 200. In an alternative embodiment, node B 102 may detect or negotiate the data offload, in which case node B 102 may be the source of heartbeat packets 200 or may instruct RNC 104 to generate heartbeat packets 200. In yet another embodiment, some other node positioned along the data path between UE1 100 and GGSN 108 may be the source of heartbeat packets 200.

Referring now to FIG. 2B, in one embodiment, the data offload condition may be detected by HNB 118, SeGW 120, HNB-GW 122, or by some other node positioned along the data path between UE1 100 and GGSN 108. In one embodiment SeGW 120 or HNB-GW 122 may detect or even help negotiate the data offload and the establishment of alternative data path 122 between UE1 100 and IPNW2 116. In this embodiment, SeGW 120 or HNB-GW 122 may be the source of heartbeat packets 200, or SeGW 120 or HNB-GW 122 may instruct HNB 118 to generate heartbeat packets 200. In an alternative embodiment, HNB 118 may detect or negotiate the data offload, in which case HNB 118 may be the source of heartbeat packets 200 or may instruct SeGW 120 or HNB-GW 122 to generate heartbeat packets 200. In yet another embodiment, some other node positioned along the data path between UE1 100 and GGSN 108 may be the source of heartbeat packets 200.

Each of FIGS. 2A and 2B illustrate the result of the data packets 200, namely, that the PDP context maintained for UE1 100 within context database 114 is maintained during the data offload condition.

FIGS. 3A-3D are block diagrams showing possible configurations of signaling and data paths through the various nodes of the system. In FIGS. 3A-3D, a system that implements home node B networking is used as an example, but the subject matter described herein is applicable to other types of telecommunications systems as well. In contrast to the embodiment illustrated in FIG. 2B, in which the security gateway function and the home node B gateway function are include within the same node SeGW 120, the embodiments illustrated in FIGS. 3A-3D have divided these two functions into separate nodes, secure gateway (SeGW) 300 and home node B gateway (HNB-GW) 302. In each of FIGS. 3A-3D, the signaling plane or signaling path is shown as a thin line and the user plane or data path is shown as a thick line. The functions of SGSN 106 and GGSN 108 are the same as for their like numbered counterparts in FIG. 1, and therefore their descriptions will not be repeated here.

In each of FIGS. 3A-3D, the signaling path goes through SeGW 300, HNB-GW 302, SGSN 106 and GGSN 108. The differences between the four configurations relate to the path taken by the data packets, i.e., which nodes are part of the data path.

Figure 3A:
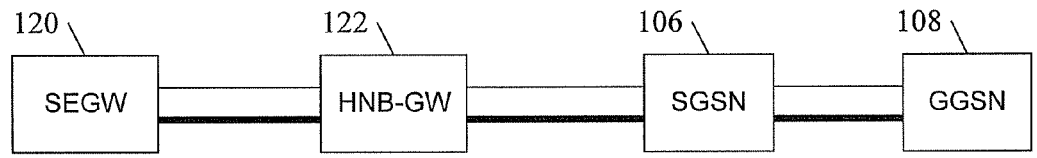
FIG. 3A through 3D are block diagrams illustrating various configurations for routing signaling plane and user plane traffic according to embodiments of the subject matter described herein.

In FIG. 3A, the data packets travel through all four nodes: SeGW 300, HNB-GW 302, SGSN 106, and GGSN 108. However, although HNB-GW 302 is a mandatory part of the signaling path, it does not need to be part of the data path.

Figure 3B:
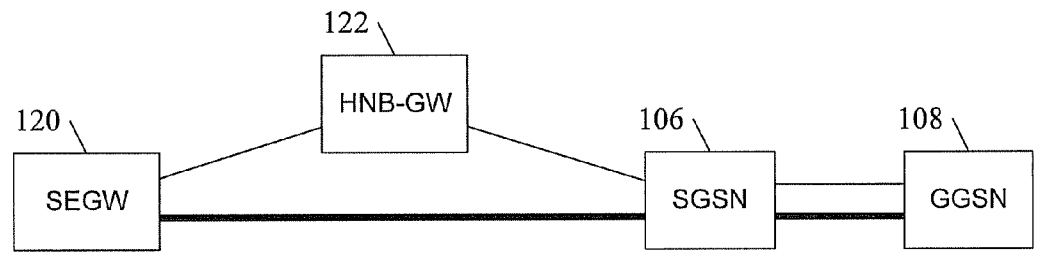

FIG. 3B illustrates an such an embodiment, in which HNB-GW 302 does not occupy the user plane and therefore data packets follow a path that bypasses HNB-GW 302.

Figure 3C:
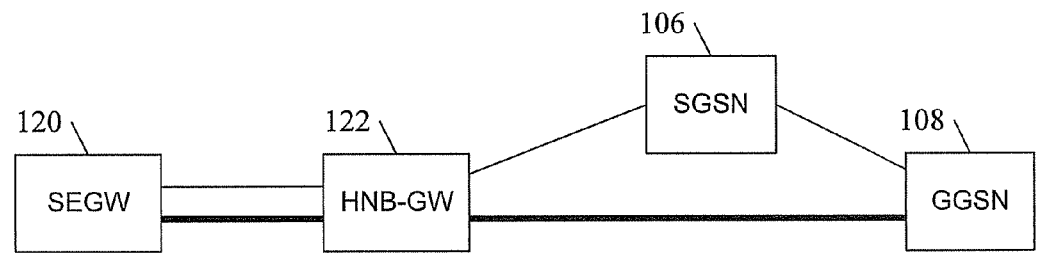

FIG. 3C illustrates yet another possible embodiment, in which SGSN 106 is involved in negotiation of a data path, but either is never a part of the data path between HNB-GW 302 and GGSN 108 or is initially part of the data path but later instructs HNB-GW 302 to route packets directly to GGSN 108 and thus bypass SGSN 106. The condition in which packets bypass the SSGN and go directly to the GGSN is referred to as "direct tunneling". During direct tunneling, SGSN 106 need not maintain the PDP context and typically discards the PDP context and releases resources for use by other sessions. Likewise, during direct tunneling, SGSN 106 need not maintain an idle timer for that session, since the data path for that session bypasses SGSN 106.

Figure 3D:
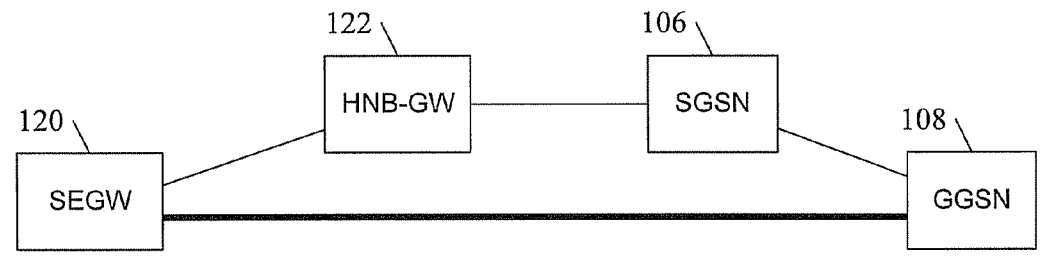

FIG. 3D illustrates the combination of a HNB-GW that does not occupy the user plane as shown in FIG. 3B and the direct tunneling scenario illustrated in FIG. 3D. In FIG. 3D, the signaling path goes through HNB-GW 302 and SGSN 106 but the data path goes directly from SeGW 300 to GGSN 108, bypassing HNB-GW 302 and SGSN 106. As in the configuration illustrated in FIG. 3C, SGSN 106 may initially be included in the data path but later instruct SeGW 300 to route data packets directly to GGSN 108.

Thus, by reviewing FIGS. 3A-3D, it can be seen that, depending on the particular configuration, there are a variety of nodes that could generate the heartbeat packets, and there are a variety of nodes to which those heartbeat packets could be sent.

Referring to FIG. 3A, for example, since SGSN 106 is on the data path, the heartbeat packets may be addressed to SGSN 106, and SGSN 106 would forward the packets to GGSN 108, thus preventing GGSN 108 from discarding the PDP context of the UE on whose behalf the heartbeat packets are being sent. Thus, both SGSN 106 and GGSN 108 may maintain PDP contexts for the same session, and both SGSN 106 and GGSN 108 may implement their own idle timers. In the embodiment illustrated in FIG. 3A, the heartbeat packets could be sent from HNB-GW 302, SeGW 300, or any other node in the system downstream from (i.e., to the left of in FIG. 3A) SGSN 106. In one embodiment, upon arrival of the heartbeat packet, SGSN 106 may restart or reset its idle timer and send the packet to GGSN 108, which causes GGSN 108 to restart or reset its idle timer as well.

In FIG. 3B, however, HNB-GW 302 is not on the data path to SGSN 106/GGSN 108, so HNB-GW 302 would not be the source of the heartbeat packets, although SeGW 300 could be. In the embodiment illustrated in FIG. 3B the heartbeat packets would go to SGSN 106, which can then forward them to GGSN 108.

In FIG. 3C, SeGW 300, HNB-GW 302, or some other node downstream from GGSN 108 could be the source of the heartbeat packets. In the embodiment illustrated in FIG. 3C, SGSN 106 is not likely to be the source of the heartbeat packets, since SGSN 106 is not participating in the data path between SeGW 300 and GGSN 108. Likewise, the packets would be addressed to GGSN 108 instead of to SGSN 106.

In FIG. 3D, the signaling path includes SeGW 300, HNB-GW 302, SGSN 106, and GGSN 108, but the data path connects SeGW 300 directly to GGSN 108. Therefore, HNB-GW 302 would not be the source of heartbeat packets and SGSN 106 would not be the destination for those heartbeat packets.

In short, the heartbeat packets are generated by a node that is both downstream from SGSN 106 and also on the data path between SeGW 300 and GGSN 108. In addition, in most configurations the heartbeat packets will be sent to either SGSN 106 or GGSN 108, but not both. However, there is at least one configuration in which heartbeat packets may be sent to both the SGSN and the GGSN: a system may include an offload gateway, which acts as a GTP-U proxy. The offload gateway may be located topologically on the data path between the SGSN and the GGSN, in which case the offload gateway appears as a GGSN to the SGSN and appears as a SGSN to the GGSN. From the signaling point of view, however, the offload gateway is located topologically on the signaling path downstream from the SGSN. Thus, when the offload gateway is operating as the terminating end of a GTP-U, the offload gateway sends heartbeat packets to both the SGSN and the GGSN.

Figure 4:
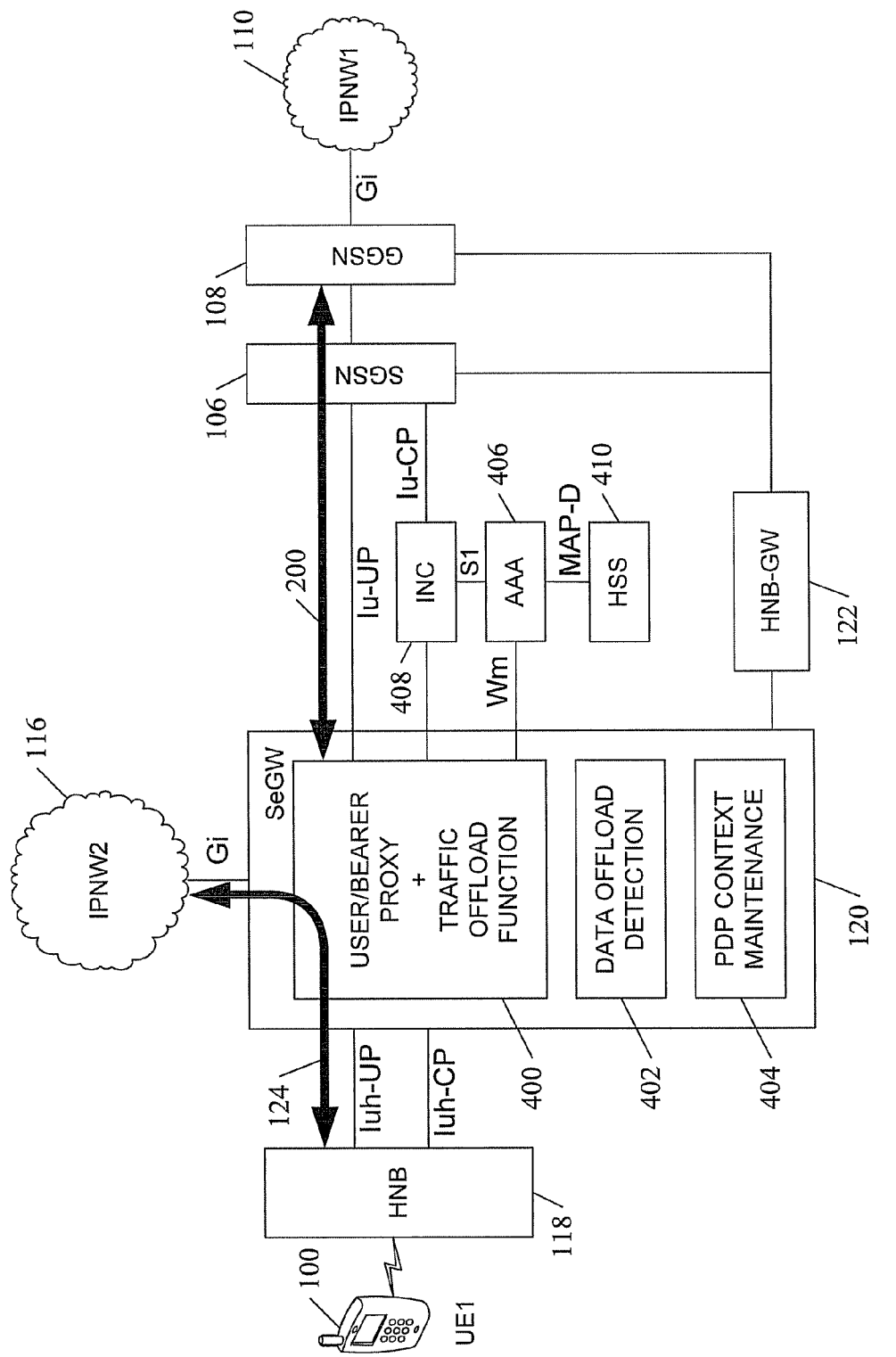
FIG. 4 is a block diagram showing in more detail an exemplary system for maintaining PDP context while performing data offload according to an embodiment of the subject matter described herein.

FIG. 4 is a block diagram showing in more detail an exemplary system for maintaining PDP context while performing data offload according to an embodiment of the subject matter described herein. Elements UE1 100, SGSN 106, GGSN 108, IPNW1 110, IPNW2 116, HNB 118, SeGW 120, HNB-GW 122, alternative data path 122, and data packets 200 are identical to their like-numbered counterparts described above and their descriptions will not be repeated here.

In the embodiment illustrated in FIG. 4, security gateway 120 includes a user/bearer proxy 400, a data offload detection module 402, and a PDP context maintenance module 404. User/bearer proxy 400 may include a traffic offload function (TOF) for offloading traffic. Data offload detection module 402 detects a data offload condition in which UE1 100 is sending or receiving data using a data path that does not include the GGSN that is currently maintaining the PDP context for UE1 100,e.g., SGSN 106 and/or GGSN 108. For simplicity of description, it will be assumed that in the embodiment illustrated in FIG. 4, the PDP context for UE1 100 is being maintained only by GGSN 108. For the reasons stated above, however, the same principle of operation will apply in alternative embodiments, such as where SGSN 106 maintains the PDP context or where SGSN 106 and GGSN 108 both maintain copies of the PDP context. PDP context maintenance module 404 sends data packets to GGSN 108 while the data offload condition exists, so as to cause GGSN 108 to maintain the PDP context for UE1 100.

User/bearer proxy 400 may be located within HNB-GW 122. In the embodiment illustrated in FIG. 4, HNB-GW 122 is separate from SeGW 120. In an alternative embodiment, HNB-GW 122 may be collocated with, integrated with, or a component of SeGW 120. In this embodiment, the combined SeGW 120/HNB-GW 122 is considered to be on the data path between UE1 100 and GGSN 108 (or SGSN 106 in embodiments where SGSN 106 maintains the PDP context), in which case the data offload detection and/or the PDP context maintenance function may reside within the merged SeGW 120/HNB-GW 122.

In the embodiment illustrated in FIG. 4, SeGW 120 communicates with an authentication, authorization, and accounting (AAA) server 406, e.g., via a Wm interface. In one embodiment, the system may include an IP network controller (INC) 408 for controlling some or all of the various components within the system. INC 408 may be a component within SeGW 120 or HNB-GW 122, or it may be separate from both. In the embodiment illustrated in FIG. 4, INC 408 communicates with AAA 406 via an S1 interface and communicates with SGSN 106 via an Iu-PS interface. AAA 406 communicates to a home subscriber server (HSS) 410, e.g., via a MAP-D interface.

In one embodiment, user/bearer proxy 400 may be a GTP-U relay. The GPRS tunneling protocol for the user plane (GTP-U) is a protocol that tunnels user data between the UE and the GSN, and between GSN core network nodes in the backbone network. GTP encapsulates all PDP packet data units (PDUs). The tunnel endpoint ID (TEID), which is present in the GTP header, indicates which tunnel a particular PDU belongs to. In this manner, packets are multiplexed and de-multiplexed by GTP-U between a given pair of tunnel endpoints. The TEID value to be used in the TEID field is typically negotiated during the creation of the PDP context.

Figure 5:
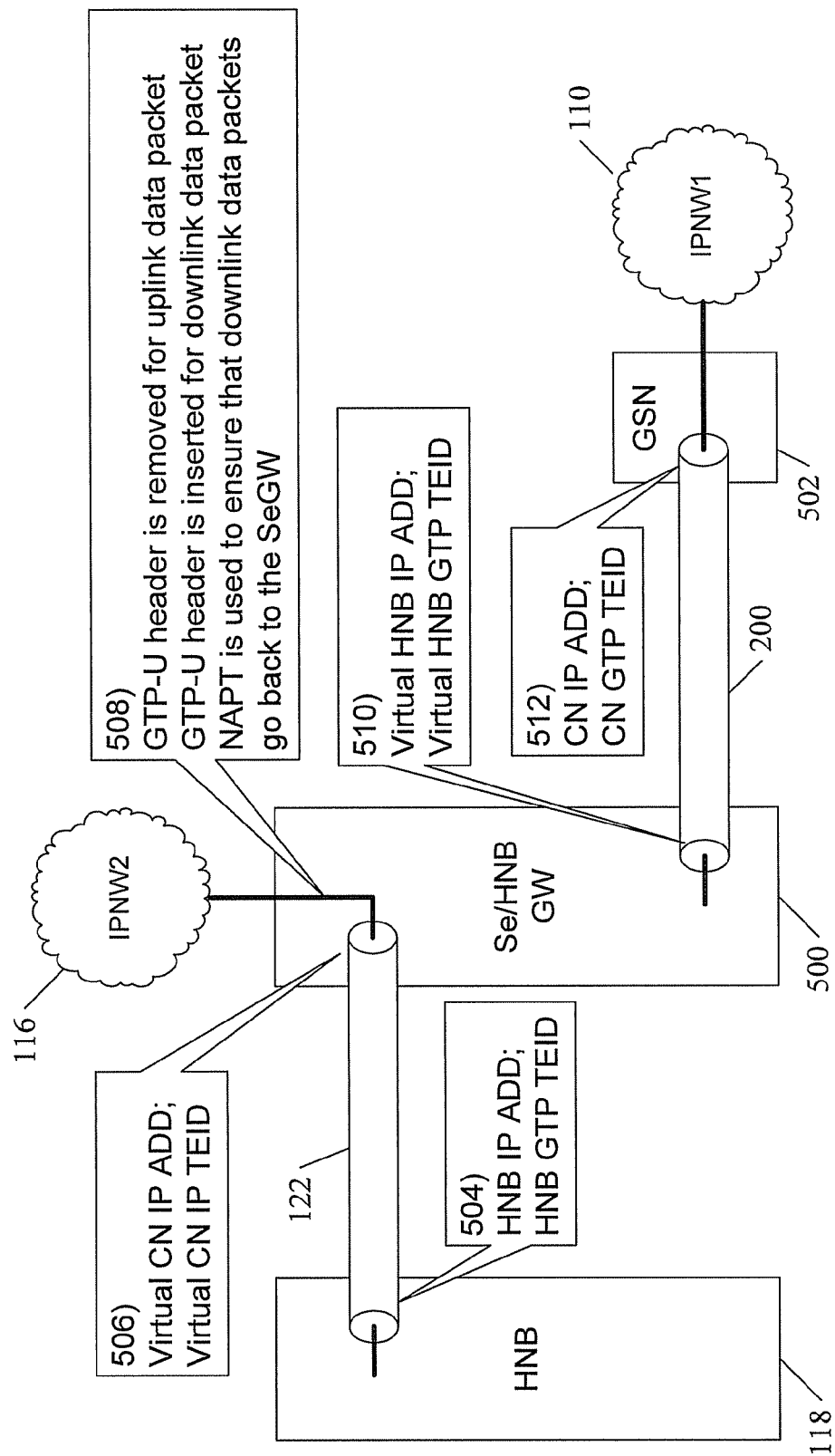
FIG. 5 is a block diagram illustrating GTP-U tunneling in an exemplary system for maintaining PDP context while performing data offload according to an embodiment of the subject matter described herein.

FIG. 5 is a block diagram illustrating GTP-U tunneling in an exemplary system for maintaining PDP context while performing data offload according to an embodiment of the subject matter described herein. Elements IPNW1 110, IPNW2 116, HNB 118, alternative data path 124, and data packets 200 are identical to their like-numbered counterparts described above and their descriptions will not be repeated here. Combined security gateway/home node B gateway (Se/HNB GW) 500 includes the functionality of SeGW 120 and HBN-GW 122 as described above. Generic GPRS support node GSN 502 may be an SGSN 106, a GGSN 108, or both.

During data offload, where the UE is communicating with IPNW2 116 via alternative data path 124, a GTP tunnel must be set up between HNB 118 and Se/HNB GW 500. This tunnel is represented in FIG. 4 as a pipe between HNB 118 and Se/HNB GW 500 and through which data path 124 travels. In one embodiment, this GTP tunnel is established by Se/HNB GW 500, which maintains the identities of each end of the tunnel. Thus, one end of this GTP tunnel is identified by the GTP TEID of HNB 118, as shown in callout 504 in FIG. 5 and the other end of the tunnel is identified by the GTP TEID of Se/HNB GW 500, as shown in callout 506 in FIG. 5.

During the data offload operation, Se/HNB GW 500 must modify the packet headers of packets communicated between Se/HNB GW 500 and IPNW2 116. Since IPNW2 116 does not use GTP tunneling and does not necessarily understand the TEID addresses used for GTP tunneling, packets going from IPNW2 116 to Se/HNB GW 500, called "downlink" packets, must be encapsulated in a GTP-U tunnel, and packets going from Se/HNB GW 500 to IPNW2 116, called "uplink" packets, must be un-encapsulated. In one embodiment, Se/HNB GW 500 removes the GTP-U header from uplink packets and inserts a GTP-U header into downlink packets. Furthermore, Se/HNB GW 500 may map the IP addresses used by IPNW2 116 to the corresponding TEIDs used by HNB 118, e.g., by implementing network address translation, such as NAT44, NAT64, NAPT, etc. These functions are described in callout 508 in FIG. 5.

Similarly, the periodic or handshake packets sent to GSN 502 to maintain the PDP context for the UE, such as data packets 200, must also be transmitted via a GTP tunnel, represented in FIG. 4 as a pipe between Se/HNB GW 500 and GSN 502 and through which data packets 200 travel. In the embodiment illustrated in FIG. 5, one end of this GTP tunnel is identified by a virtual GTP TEID of HNB 118, as shown in callout 510. The virtual GTP TEID of HNB 118 is used so that data packets 200 received by GSN 502 appear to have come from HNB 118 (or from UE1 100 via HNB 118), so that the PDP context for UE1 100 maintained by GSN 502 is not dismantled due to an idle timeout. The other end of the tunnel is identified by the GTP TEID of the core network (CN), which in the embodiment illustrated in FIG. 5 is the GTP TEID of GSN 502, as shown in callout 512.

Figure 6:
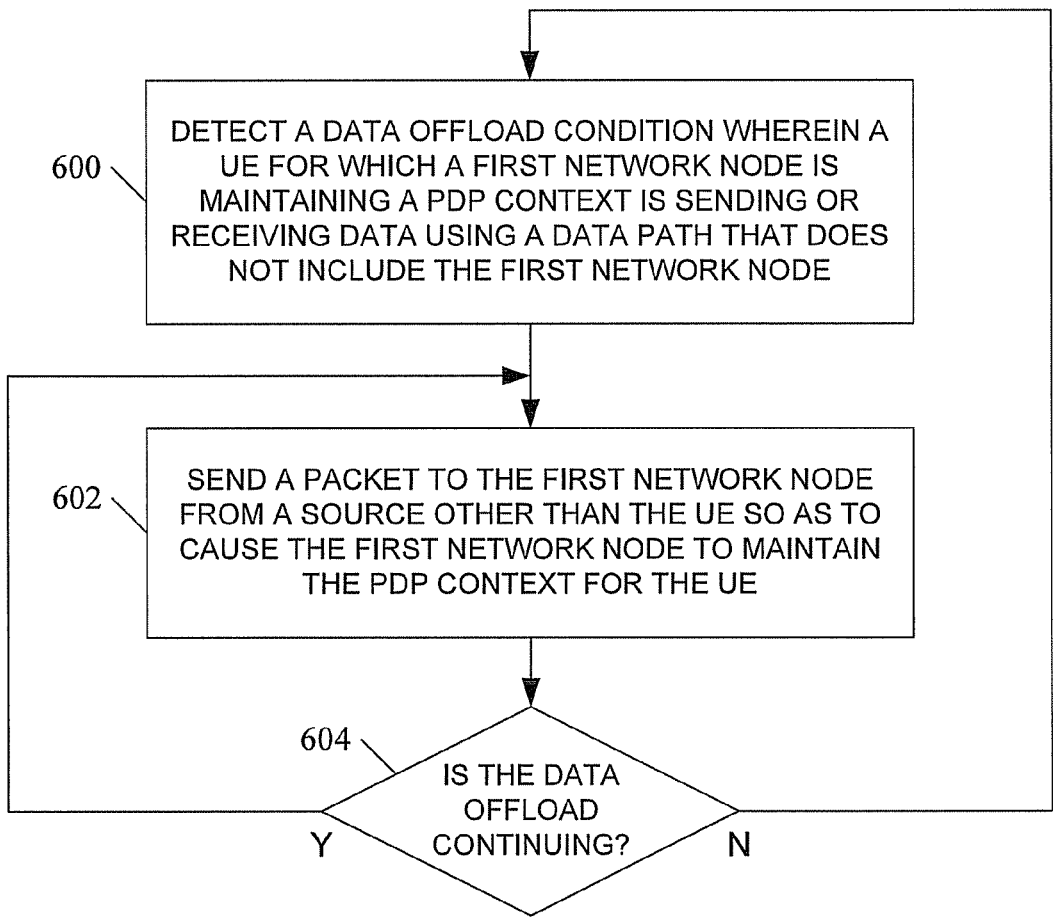
FIG. 6 is a flow chart illustrating an exemplary process for maintaining packet data protocol (PDP) context while performing data offload according to an embodiment of the subject matter described herein.

FIG. 6 is a flow chart illustrating an exemplary process for maintaining PDP context while performing data offload according to an embodiment of the subject matter described herein.

At block 600, a data offload condition is detected wherein a UE for which a first network node is maintaining a PDP context is sending or receiving data using a data path that does not include the first network node. In alternative embodiments, the data offload condition may be detected by node B 102, RNC 104, or SGSN 106 in FIG. 2A, by HNB 118, SeGW 120, HNB-GW 122, or SGSN 106 in FIG. 2B, or by another node in the network other than UE1 100 or GGSN 108. In telecommunications networks that include an evolved node B ((e)NB) or a home evolved node B (H(e)NB), the data offload condition may be detected by the (e)NB or H(e)NB. Alternatively, the data offload may occur at the HNB or H(e)NB, e.g., local IP access (LIPA) to a home network and/or the Internet.

At block 602, a data packet is sent to the first network node from a source other than the UE so as to cause the first network node to maintain the PDP context for the UE. In alternative embodiments, data packets 200 may be sent to GGSN 108 by node B 102, RNC 104, or SGSN 106 in FIG. 2A, by HNB 118, SeGW 120, or SGSN 106 in FIG. 2B, by HNB-GW 122 if HNB-GW 122 is part of the user plane data path, or by another node in the network other than UE1 100 or GGSN 108 that is along the data path connecting UE1 100 and GGSN 108. In telecommunications networks that include evolved node Bs or home evolved node Bs, data packets 200 may be sent to GGSN 108 by the (e)NB or H(e)NB.

At block 604, it is determined whether or not the data offload condition associated with the UE is continuing. If the data offload condition is still continuing, the process returns to block 602 and another packet is sent to the first network node. On the other hand, if the data offload condition has completed or has been terminated, the process does not continue to send packets but instead returns to block 600 and waits for the detection of another data offload condition.

In the embodiments described above, HNB-GW 122 provides a signaling path into a packet network, such as IPNW1 110, but the subject matter described herein is not limited to only this configuration Other configurations are contemplated. In one embodiment, HNB-GW 122 may extend a session into a circuit switched network. For example, HNB-GW 122 may communicate with a mobile switching center, or MSC.

One advantage of the subject matter described herein over existing solutions is that it considers the existence of a data offload stream and ensures that the PDP context for the UE, and therefore the IP address assigned to the UE, is maintained even when the UE is involved in a data offload condition. Thus prevents the premature reassignment of the UE's IP address to another UE and the problems that this may cause.

In alternative embodiments, PDP context may be maintained by nodes other than GGSNs or SGSNs. Example nodes which may maintain PDP context include, but are not limited to, a packet data gateway (PDG), an evolved packet data gateway (ePDG), a tunnel termination gateway (TTG) or TTG-GGSN, a serving gateway (SGW), a packet data network gateway (PGW), a home enhanced node B gateway (H(e)NB-GW), and an access service network gateway (ASN-GW).

The subject matter described herein is not limited to the embodiments described above. Any node logically located along the data path between a node, such as a UE, that uses a PDP context and a node, such as a GGSN, that maintains that PDP context may engage in data offload. The node that engages in data offload and any node upstream from that node may send heartbeat messages to the node that maintains the PDP context. In one embodiment, some or all of the upstream nodes except for the node that maintains the PDP context may be bypassed or otherwise not participate in the communication of heartbeat messages to the node that maintains the PDP context.

It will be understood that various details of the subject matter described herein may be changed without departing from the scope of the subject matter described herein. Furthermore, the foregoing description is for the purpose of illustration only, and not for the purpose of limitation.

What is claimed is:

1. A method, comprising:
    after a determination that a user equipment (UE) for which
        a Gateway General Packet Radio Services (GPRS) Support Node (GGSN) is maintaining a Packet Data Protocol (PDP), context record is sending or receiving data using a data path that does not include the GGSN, wherein the GGSN is configured to release the PDP context record after a predetermined amount of time in response to not having received a communication originated by or directed to the UE, originating a data packet at a source other than the UE, the source located downstream from a Serving GPRS Support Node (SGSN) and on a data path between a Security Gateway (SeGW) and the GGSN, and sending the data packet from the source to the GGSN, the GGSN configured to maintain the PDP context record beyond the predetermined amount of time in response to having received the data packet.

2. The method of claim 1, wherein the source is selected from the group consisting of:
a node B;
an evolved node B;
a radio network controller (RNC);
a home node B (HNB);
a home evolved node B (H(e)NB);
a security gateway (SeGW);
a home node B gateway (HNB-GW);
a home evolved node B gateway (H(e)NB-GW);
a packet data gateway (PDG);
an evolved packet data gateway (ePDG);
a tunnel termination gateway (TTG);
a serving gateway (SGW);
a packet data network gateway (PGW);
an access service network gateway (ASN-GW); and
another network node interposed between the UE and the GGSN.

3. The method of claim 1, wherein sending the data packet includes periodically sending dummy packets or heartbeat packets to the GGSN.

4. The method of claim 1, wherein sending the data packet includes sending a data packet that the GGSN recognizes as being associated with the UE.

5. The method of claim 4, wherein sending the data packet that the GGSN recognizes as being associated with the UE includes sending a data packet that identifies the UE as the source of the data packet.

6. The method of claim 4, wherein sending the data packet that the GGSN recognizes as being associated with the UE includes sending a data packet that includes a tunnel endpoint identification (TEID) associated with the UE.

7. The method of claim 1, wherein the data packet is encapsulated using a GPRS tunneling protocol.

8. The method of claim 1, wherein sending the data packet includes sending an instruction to maintain the PDP context record even when no data packets associated with the UE are received by the GGSN.

9. The method of claim 8, further comprising after a determination that the UE is no longer sending or receiving data using the data path, sending to the GGSN another instruction cancelling the instruction to maintain the PDP context record even when no data packets associated with the UE are received by the GGSN.

10. A system located downstream from a Serving General Packet Radio Service (GPRS) Support Node (SGSN) and on a data path between a Security Gateway (SeGW) and a Gateway GPRS Support Node (GGSN), the system comprising:
a processor;
a memory coupled to the processor, the memory configured to store program instructions that, upon execution by the processor, cause the system to:
in response to a determination that a user equipment (UE) for which the GGSN is maintaining a Packet Data Protocol (PDP), context record is sending or receiving data using a data path that does not include the GGSN, generate a data packet in the absence of instructions from the UE, and send the data packet to the GGSN, the GGSN configured to release the PDP context record if the GGSN has not received a communication originated by or sent to the UE, the GGSN further configured to maintain the PDP context record upon having received the data packet.

11. The system of claim 10, wherein the system comprises or is a component of:
a node B;
an evolved node B;
a radio network controller (RNC);
a home node B (HNB);
a home evolved node B (H(e)NB);
a security gateway (SeGW);
a home node B gateway (HNB-GW);
a home evolved node B gateway (H(e)NB-GW);
a packet data gateway (PDG);
an evolved packet data gateway (ePDG);
a tunnel termination gateway (TTG);
a serving gateway (SGW);
a packet data network gateway (PGW);
an access service network gateway (ASN-GW); or
another network node interposed between the UE and the GGSN.

12. The system of claim 10, wherein to send the data packet, the program instructions, upon execution by the processor, cause the system to periodically send dummy packets or heartbeat packets to the GGSN.

13. The system of claim 10, wherein to send the data packet, the program instructions, upon execution by the processor, further cause the system to send a data packet that the GGSN recognizes as being associated with the UE.

14. The system of claim 13, wherein the data packet that the GGSN recognizes as being associated with the UE includes a packet that identifies the UE as the source of the packet.

15. The system of claim 13, wherein the data packet that the GGSN recognizes as being associated with the UE includes a tunnel endpoint identification (TEID) associated with the UE.

16. The system of claim 10, wherein the data packet is encapsulated using a GPRS tunneling protocol.

17. The system of claim 10, wherein the data packet includes an instruction to maintain the PDP context record even when no data packets associated with the UE are received by the GGSN.

18. The system of claim 17, wherein the program instructions, upon execution by the processor, further cause the system to send to the GGSN another instruction cancelling the instruction to maintain the PDP context record in response to a determination that the UE is no longer sending or receiving data using the data path.

19. A non-transitory computer readable medium having stored thereon executable instructions that, when executed by a processor of a computing node located downstream from a Serving General Packet Radio Service (GPRS) Support Node (SGSN) and on a data path between a Security Gateway (SeGW) and a Gateway GPRS Support Node (GGSN), cause the computing node to:
detect a data offload condition wherein a user equipment (UE) for which the GGSN is maintaining a Packet Data Protocol (PDP), context record is sending or receiving data using a data path that does not include the GGSN, the GGSN configured to release the PDP context record based, at least in part, upon the detection of the data offload condition;

generate a data packet without intervention by the UE; and send, while the data offload condition exists, one or more data packets to the GGSN from a source other than the UE so as to cause the GGSN to maintain the PDP context record for the UE despite the detection of the data offload condition in response to having received the one or more data packets.

20. The non-transitory computer readable medium of claim 19, wherein releasing the PDP context record based, at least in part, upon the detection of the data offload condition includes releasing the PDP context record after expiration of a timer in response to not having received a communication originated by or directed to the UE.

21. The non-transitory computer readable medium of claim 20, wherein maintaining the PDP context record for the UE despite the detection of the data offload condition includes maintaining the PDP context record beyond the expiration of the timer.

* * * * *